US010696500B2

(12) United States Patent
Yule et al.

(10) Patent No.: US 10,696,500 B2
(45) Date of Patent: Jun. 30, 2020

(54) VERTICALLY OPERABLE RESTRAINT FOR A LOADING DOCK HAVING AN OPERABLE SECONDARY RESTRAINT

(71) Applicant: Blue Giant Equipment Corporation, Brampton (CA)

(72) Inventors: Robert Campbell Yule, Cambridge (CA); Paulo Jorge da Silva Cruz, Toronto (CA)

(73) Assignee: Blue Giant Equipment Corporation, Mississauga (CA)

( * ) Notice: Subject to any disclaimer, the term of this patent is extended or adjusted under 35 U.S.C. 154(b) by 0 days.

(21) Appl. No.: 16/444,348

(22) Filed: Jun. 18, 2019

(65) Prior Publication Data

US 2019/0300302 A1 Oct. 3, 2019

Related U.S. Application Data

(63) Continuation of application No. 15/875,371, filed on Jan. 19, 2018, now Pat. No. 10,377,586.

(60) Provisional application No. 62/450,712, filed on Jan. 26, 2017, provisional application No. 62/508,590, filed on May 19, 2017.

(51) Int. Cl.
*B65G 69/00* (2006.01)
*B65G 67/02* (2006.01)

(52) U.S. Cl.
CPC .......... *B65G 69/003* (2013.01); *B65G 67/02* (2013.01); *B65G 2203/0266* (2013.01)

(58) Field of Classification Search
CPC .................................................. B65G 69/003
USPC ........................................................ 414/401
See application file for complete search history.

(56) References Cited

U.S. PATENT DOCUMENTS 4,264,259 A * 4/1981 Hipp .................. B65G 69/003 414/401
4,589,813 A * 5/1986 Hagen ................. B65G 69/003 414/396
4,605,353 A * 8/1986 Hahn .................. B65G 69/003 16/295
4,728,242 A * 3/1988 Erlandsson .......... B65G 69/003 14/71.1
4,938,647 A 7/1990 Erlandsson
5,297,921 A * 3/1994 Springer ............. B65G 69/003 414/396
5,882,167 A * 3/1999 Hahn .................. B65G 69/003 414/396
5,964,572 A * 10/1999 Hahn .................. B65G 69/003 340/932.2
6,162,005 A 12/2000 Fritz
6,220,809 B1 4/2001 Hahn
6,488,464 B1 12/2002 Kish (Continued)

*Primary Examiner* — Kaitlin S Joerger
(74) *Attorney, Agent, or Firm* — Price Heneveld LLP

(57) ABSTRACT

A vehicle restraint for a loading dock includes a barricade member that is rotationally operable between a stored position, a blocking position and a verification position. The barricade member in the blocking position is adapted to laterally secure a vehicle relative to the loading dock. An operable latch is coupled proximate an outer end in the barricade member. The operable latch is selectively operable between retracted and extended positions. When the barricade member is in the blocking position and the operable latch is in the extended position, the operable latch vertically secures the vehicle relative to the barricade member.

20 Claims, 9 Drawing Sheets

(56) References Cited

U.S. PATENT DOCUMENTS

| | | | | |
|---|---|---|---|---|
| 7,249,926 | B1 * | 7/2007 | Mayer | B65G 69/003 414/401 |
| 7,384,229 | B2 | 6/2008 | Gleason | |
| 8,529,183 | B2 * | 9/2013 | Ion | B65G 69/003 414/396 |
| 8,596,949 | B2 | 12/2013 | Harrington | |
| 8,616,826 | B2 * | 12/2013 | Cotton | B65G 69/003 414/401 |
| 9,272,854 | B2 * | 3/2016 | Lessard | B65G 69/28 |
| 2008/0095598 | A1 * | 4/2008 | Cotton | B65G 69/003 414/401 |
| 2015/0191319 | A1 * | 7/2015 | Muhl | B65G 69/003 414/401 |
| 2017/0275106 | A1 * | 9/2017 | Gleason | B65G 69/003 |

* cited by examiner

VERTICALLY OPERABLE RESTRAINT FOR A LOADING DOCK HAVING AN OPERABLE SECONDARY RESTRAINT

CROSS-REFERENCE TO RELATED APPLICATIONS

The present application is a continuation of U.S. patent application Ser. No. 15/875,371 filed Jan. 19, 2018, entitled VERTICALLY OPERABLE RESTRAINT FOR A LOADING DOCK HAVING AN OPERABLE SECONDARY RESTRAINT, which claims priority to and the benefit under 35 U.S.C. § 119(e) of U.S. Provisional Patent Application No. 62/450,712, filed on Jan. 26, 2017, entitled BARRICADE-TYPE RESTRAINT FOR A LOADING DOCK HAVING AN OPERABLE SECONDARY RESTRAINT, and U.S. Provisional Patent Application No. 62/508,590, filed on May 19, 2017, entitled VERTICALLY OPERABLE RESTRAINT FOR A LOADING DOCK HAVING AN OPERABLE SECONDARY RESTRAINT, the entire disclosures of which are hereby incorporated herein by reference.

FIELD OF THE INVENTION

The present invention generally relates to barricade restraints for loading docks, and more specifically, a barricade restraint for a loading dock having a secondary restraint for vertically securing at least a portion of a vehicle parked at a loading dock.

BACKGROUND OF THE INVENTION

Various loading docks can include barricade restraints that are rotationally operable to a vertical position when a trailer or other vehicle is parked at a loading dock. The vertical position of the barricade restraint maintains the position of the rear impact guard between the barricade restraint and a wall of the loading dock. The barricade restraint includes a locking mechanism that secures the barricade restraint in the vertical position until the locking mechanism is removed.

SUMMARY OF THE INVENTION

According to one aspect of the present invention, a vehicle restraint for a loading dock includes a barricade member that is rotationally operable between at least a stored position and a blocking position. The barricade member in the blocking position is adapted to laterally secure a vehicle relative to the loading dock. An operable latch is coupled proximate an outer end in the barricade member. The operable latch is selectively operable between retracted and extended positions. When the barricade member is in the blocking position and the operable latch is in the extended position, the operable latch vertically secures the vehicle relative to the barricade member.

According to another aspect of the present invention, a vehicle restraint for a loading dock includes a barricade member that is rotationally attached to a base. The barricade member is rotationally operable between stored, blocking and verification positions, wherein the base and the barricade member are vertically operable relative to the loading dock. An operable latch is coupled proximate an outer end of the barricade member. The operable latch is selectively operable between retracted and extended positions. The barricade member in the blocking position selectively and laterally secures a vehicle relative to the loading dock. When the barricade member is in the blocking position and the operable latch is in the extended position, the operable latch vertically secures the vehicle relative to the barricade member.

According to another aspect of the present invention, a method for operating a vehicle barricade restraint includes rotating a barricade member from a stored position toward a blocking position. The method also includes rotating the barricade member past the blocking position to verify a location of a portion of a vehicle within a restraining area between the barricade member and a wall of a loading dock. The method also includes returning the barricade member to the blocking position after the location of the portion of the vehicle has been verified. The method also includes positioning an operable latch of the barricade member within the restraining area between the barricade member and the wall of the loading dock.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
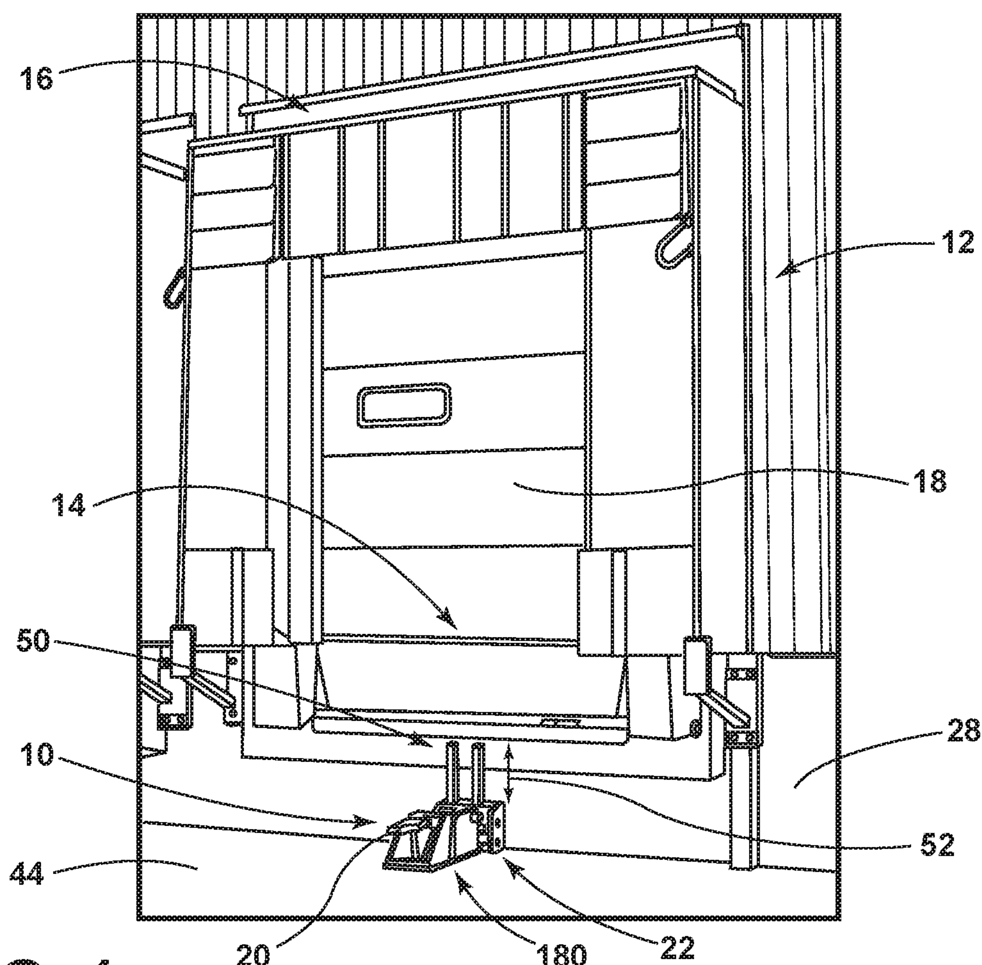
FIG. 1 is a perspective view of a loading dock incorporating an aspect of a barricade restraint including an operable latch.
Figure 2:
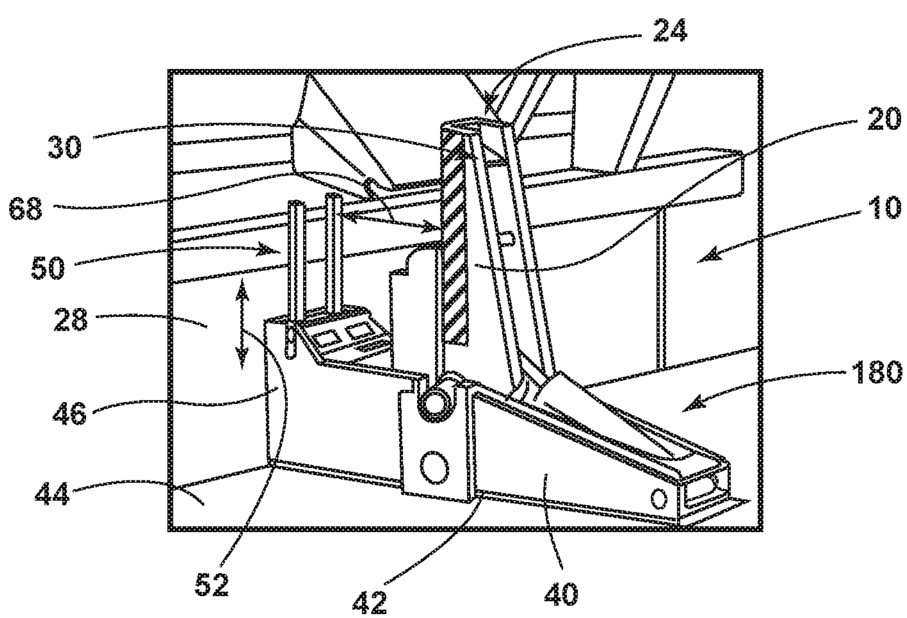
FIG. 2 is a side perspective view of a barricade restraint set in a blocking position and showing the operable latch in a retracted position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-5 and 11, reference numeral 10 generally refers to a barricade restraint installed proximate a loading dock 12. Typically, the loading dock 12 can include a dock leveler 14 and a dock shelter 16 surrounding a loading dock door 18. The barricade restraint 10 can include a barricade member 20 that is rotationally operable at least between a stored position 22 and a blocking position 24. The barricade member 20 in the blocking position 24 is adapted to laterally secure a trailer 26 and/or vehicle relative to the loading dock 12 and typically between the barricade member 20 and the wall 28 of the loading dock 12. An operable latch 30 is coupled proximate the outer end 32 of the barricade member 20. The operable latch 30 is selectively operable between a retracted position 34 and an extended position 36. When the barricade member 20 is in the blocking position 24 and the operable latch 30 is in the extended position 36, the operable latch 30 vertically secures the vehicle relative to the barricade member 20. Accordingly, the extended position 36 of the operable latch 30 extends toward the wall 28 of the loading dock 12 from the barricade member 20 in the blocking position 24.

Referring again to FIGS. 1-5 and 11, the barricade restraint 10 includes opposing structural plates 40 that extend upward from a base member 42. The base member 42 can be set upon or attached to a ground surface 44 in front 92 of the loading dock 12. The barricade restraint 10 can also include a back plate 46 that is anchored to the wall 28 of the loading dock 12. In various embodiments, the barricade restraint 10 can be vertically operable relative to the ground surface 44. In such an embodiment, the barricade restraint 10 can include a vertical track system 50 along which the back plate 46 and/or the base member 42 can perform a vertical translation 52. The use of the track system 50 is adapted to vertically align the barricade member 20 and the operable latch 30 with the rear impact guard 82 of the trailer 26.

Referring again to FIGS. 1-5, the barricade member 20 of the barricade restraint 10 can be rotated between the structural plates 40 through operation of a barricade motor 48 or other similar actuating mechanism. Such actuating mechanisms can include, but are not limited to, hydraulic cylinders, pneumatic members, combinations thereof, and other similar operating mechanisms adapted to rotate the barricade member 20 at least between the stored position 22 and the blocking position 24.

Referring again to FIGS. 1-5, a locking member 60 is disposed between the structural plates 40 and is rotated through operation of a locking motor 62. The locking member 60 is rotationally operable between a locking position 64 and a release position 66. Typically, the locking member 60 will remain in the release position 66 when the barricade member 20 is away from or distal from the blocking position 24. When the barricade member 20 is moved to the blocking position 24, the locking member 60 can be rotated to the locking position 64. In this configuration, the barricade member 20 is not operable out of the blocking position 24 until such time as the locking member 60 is moved from the locking position 64 to the release position 66. In this manner, the operating mechanism for the barricade member 20 serves to generally move the barricade member 20 between the various positions. Typically, the operating mechanism does not serve to secure the barricade member 20 in the blocking position 24. Rather, the locking member 60 in the locking position 64 secures the barricade member 20 in the blocking position 24 and prevents rotation of the barricade member 20 out of the blocking position 24. Accordingly, the barricade member 20 is able to secure very large loads and prevent forward movement of the vehicle when secured between the barricade member 20 within a restraining area 68 defined in the blocking position 24 and the wall 28 of the loading dock 12.

Referring again to FIGS. 1-5, the barricade restraint 10 can include the barricade motor 48 that selectively activates to rotate the barricade member 20 between the plurality of positions. The locking motor 62 is a separate motor that is adapted to selectively activate for operating the locking member 60 between the locking and release positions 64, 66. As discussed above, when the barricade member 20 is in the blocking position 24 and the locking member 60 is in the locking position 64, it is typical that the barricade motor 48 and locking motor 62 are substantially idle or only minimally operable such that the positioning of the barricade member 20 and locking member 60 in these positions holds the barricade member 20 in the blocking position 24.

Referring again to FIGS. 4 and 5, the operable latch 30 is adapted to supplement the lateral securing features of the barricade member 20 in the blocking position 24. In this manner, the operable latch 30 in the extended position 36 extends into the restraining area 68 and toward the wall 28 of the loading dock 12 from the retaining surface 80 of the barricade member 20. Accordingly, at least a portion of the operable latch 30 in the extended position 36 is adapted to extend over a portion of the rear impact guard 82 of the vehicle. Through this positioning, the rear impact guard 82 is laterally secured by the barricade member 20 and also vertically secured by the operable latch 30 in the extended position 36.

Figure 3:
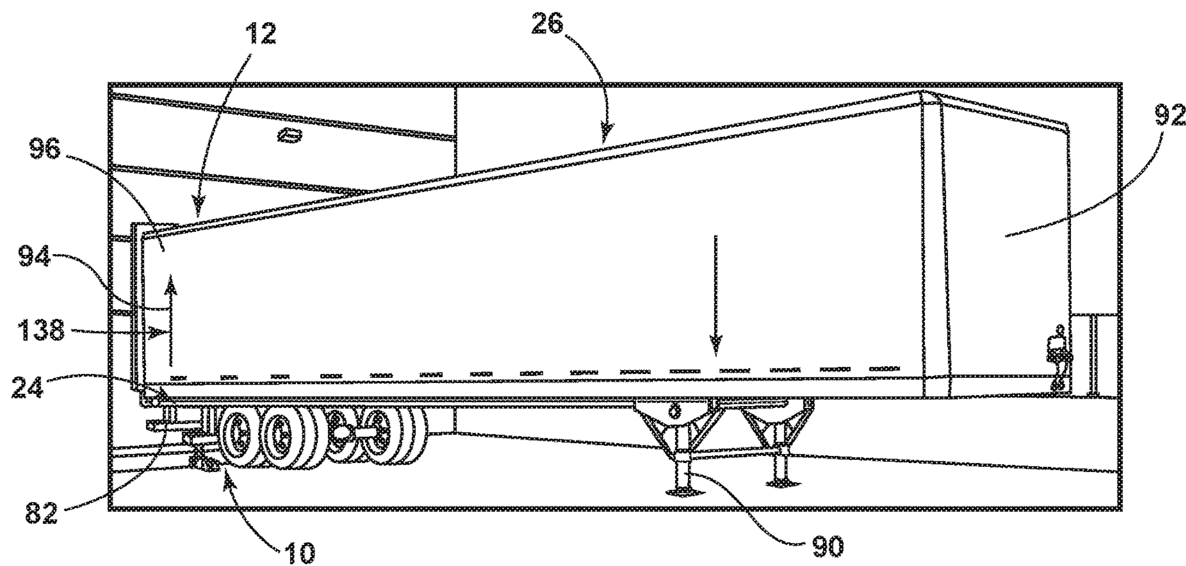
FIG. 3 is a side perspective view of a trailer parked at a loading dock having a barricade restraint.

As exemplified in FIG. 3, in certain situations, the landing gear 90 of a trailer 26 located near the front 92 of the trailer 26 may fail and cause the front 92 of the trailer 26 to dip downward. This downward dip at the front 92 of the trailer 26 can cause an upward lift 94 at the rear 96 of the trailer 26 in the area of the rear impact guard 82. If this lift 94 at the rear 96 of the trailer 26 is significant enough, the rear impact guard 82 may extend over the outer end 32 of the barricade member 20, such that the vehicle may become unsecured from between the barricade member 20 and the wall 28 of the loading dock 12. The inclusion of the operable latch 30, as exemplified in FIGS. 4-9, can serve to provide vertical support to the rear impact guard 82 in instances where the landing gear 90 of the trailer 26, or other portion of the trailer 26, may fail. The operable latch 30 provides some vertical reinforcement to maintain the rear impact guard 82 within the restraining area 68 between the barricade member 20 and the wall 28 of the loading dock 12.

Figure 4:
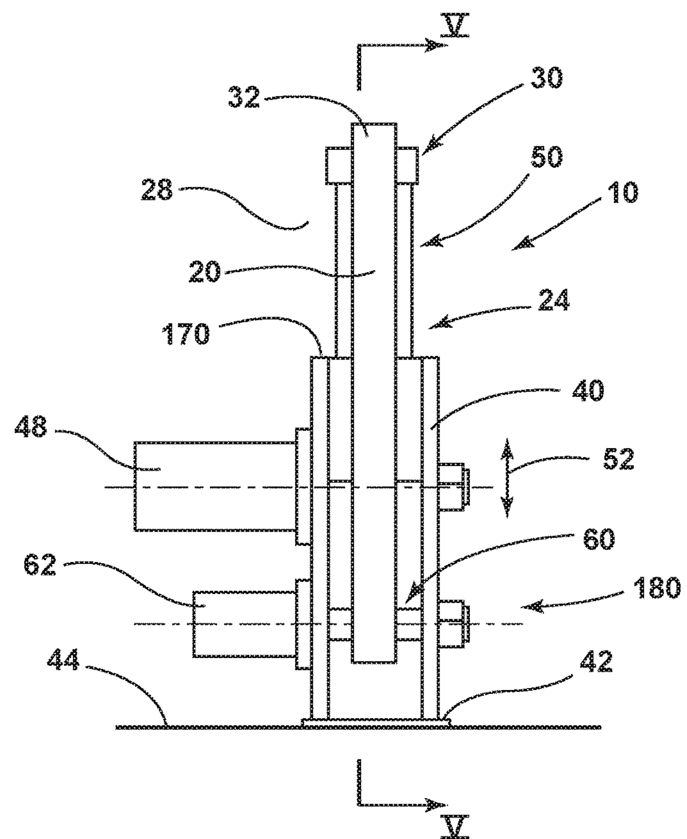
FIG. 4 is a front elevational view of an aspect of a barricade restraint incorporating the operable latch.
Figure 5:
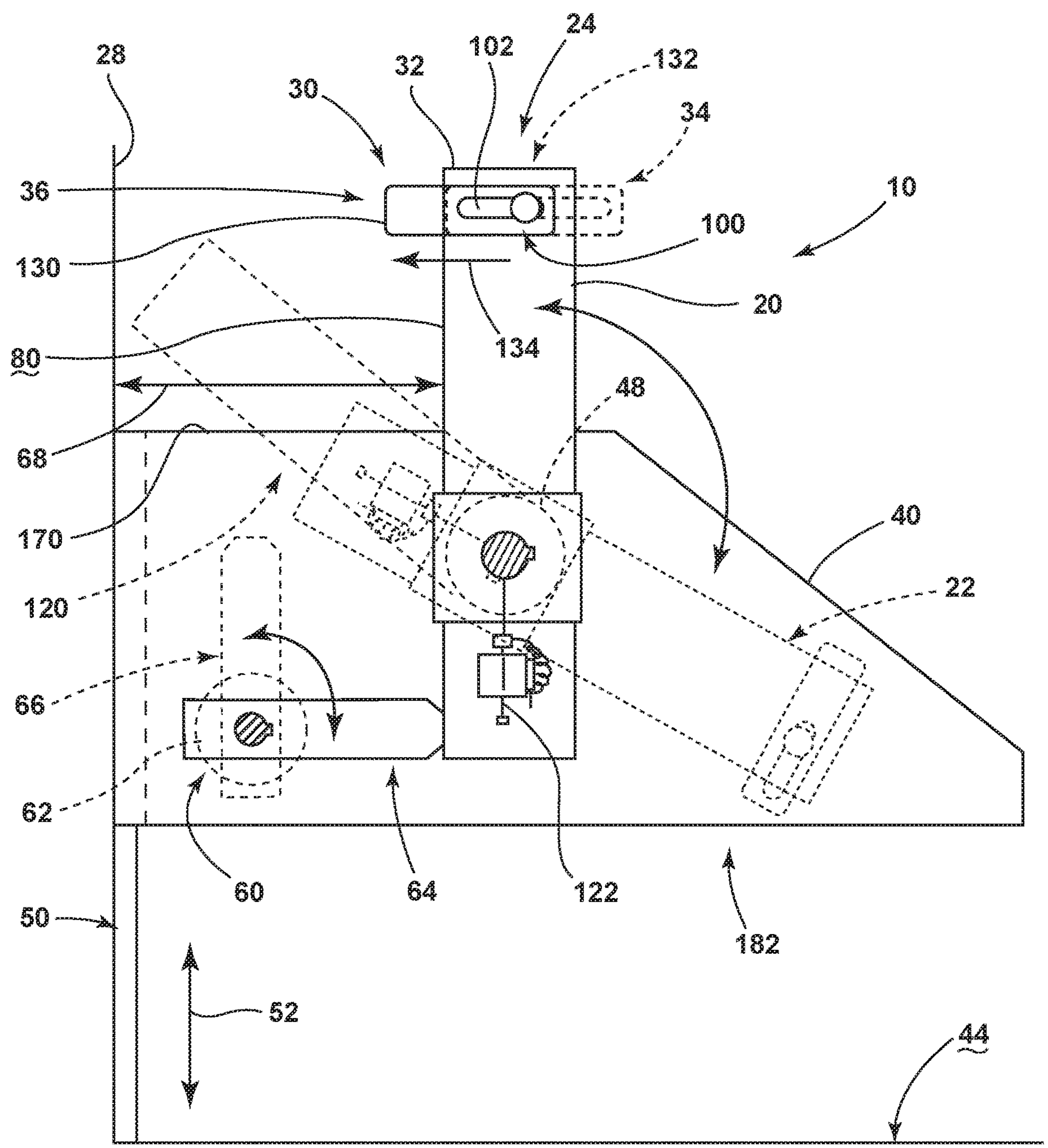
FIG. 5 is a cross-sectional view of the barricade restraint of FIG. 4 taken along line V-V and showing the operable latch in the extended position.
Figure 6:
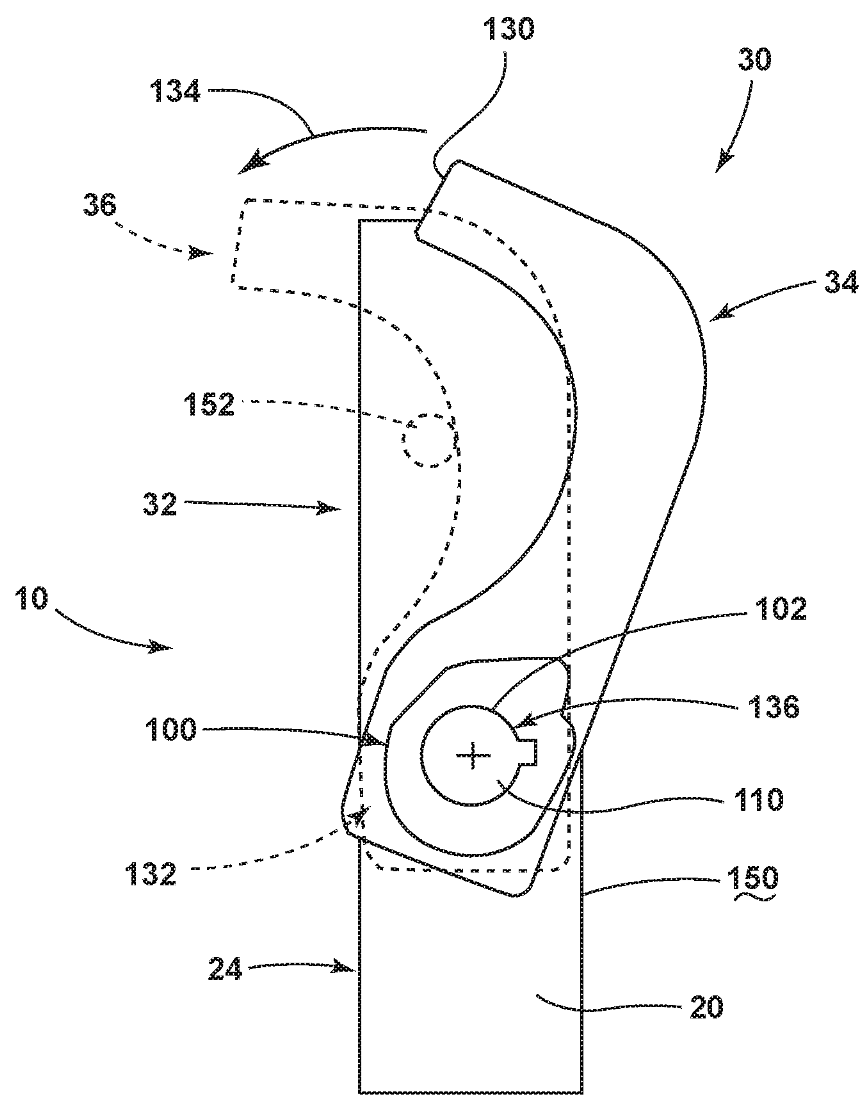
FIG. 6 is a side elevational view of an aspect of the operable latch rotationally coupled to the outer end of the barricade member and shown in the retracted position.
Figure 7:
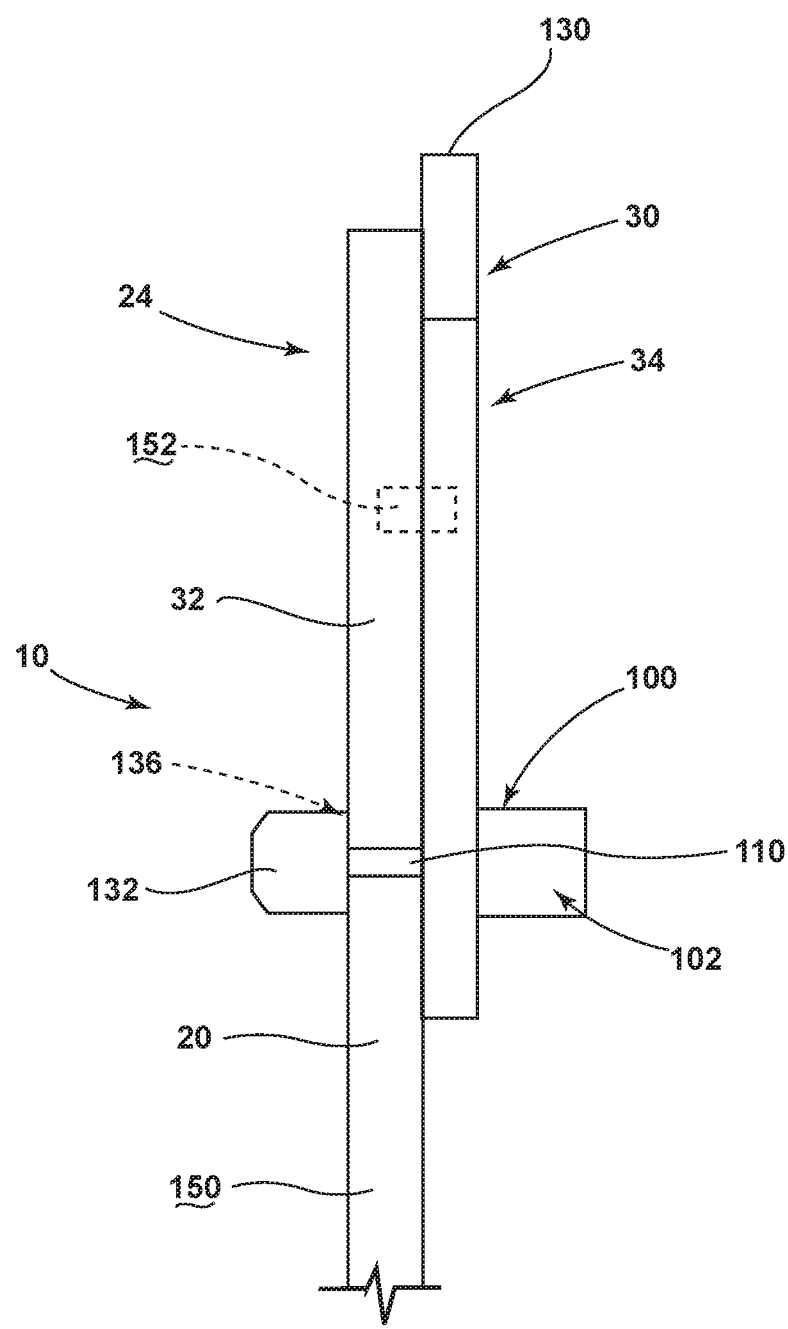
FIG. 7 is a front elevational view of the operable latch of FIG. 6.
Figure 8:
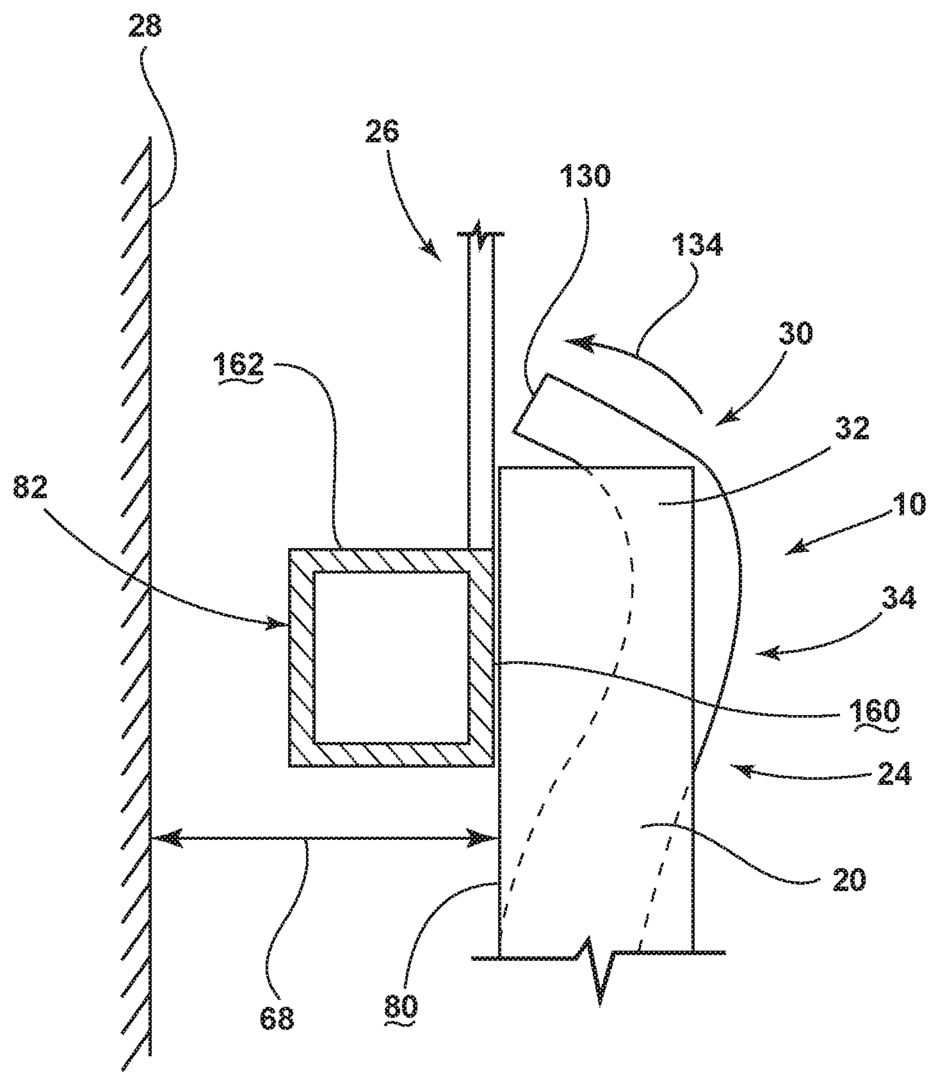
FIG. 8 is a side elevational view of a barricade restraint engaging a rear impact guard of the vehicle and showing the operable latch in a retracted position.
Figure 9:
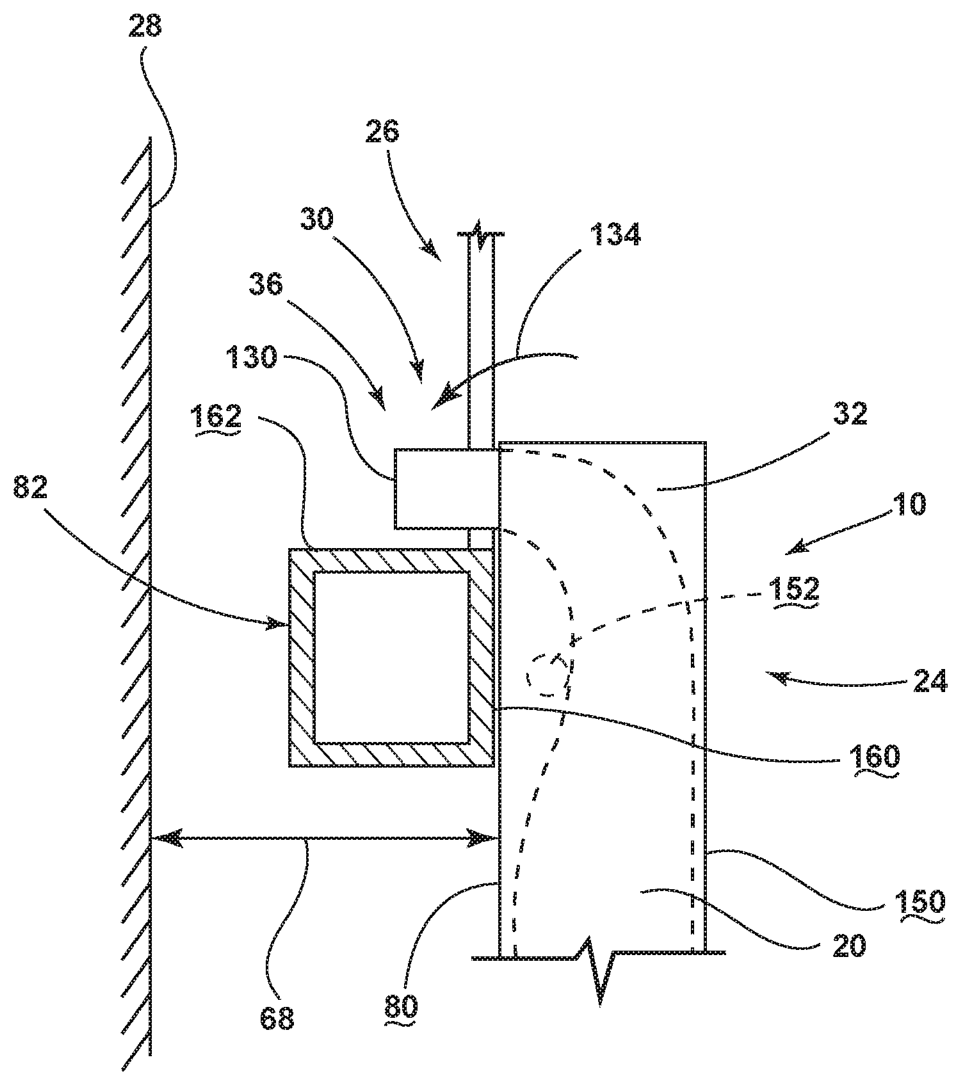
FIG. 9 is an elevational view of the barricade restraint of FIG. 8 showing the operable latch in the extended position.
Figure 10:
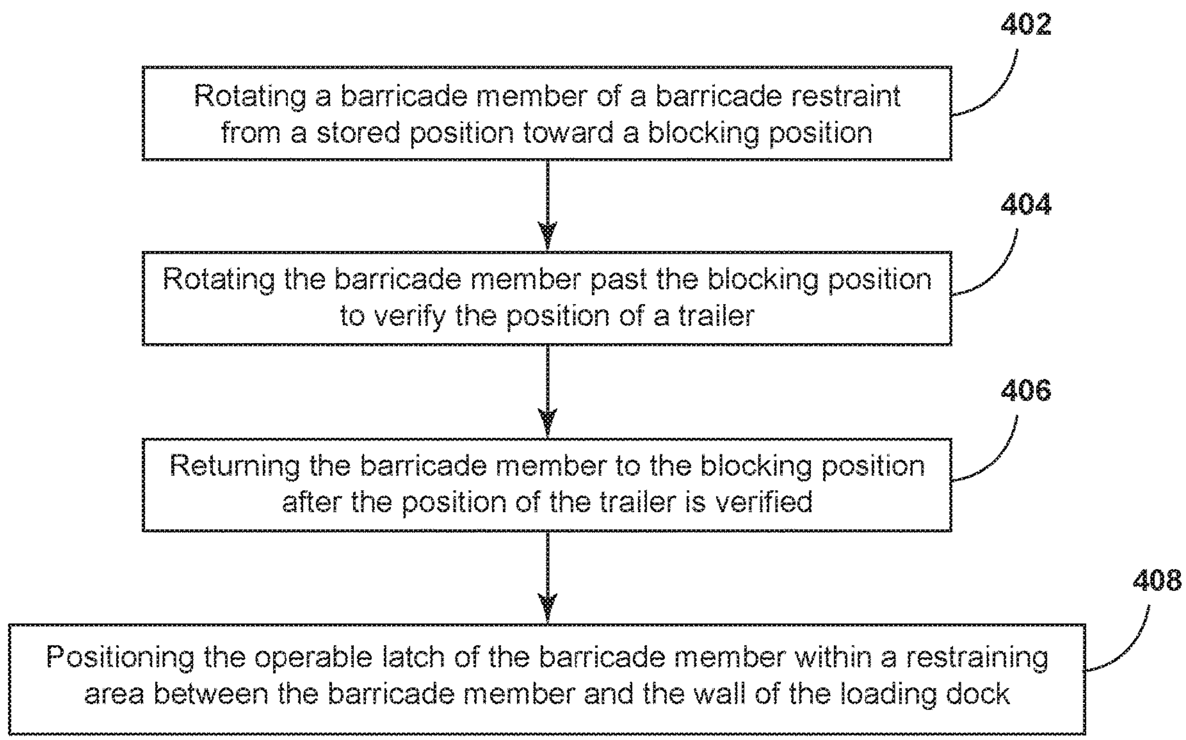
FIG. 10 is a schematic flow diagram illustrating a method for operating a barricade restraint having an operable latch.
Figure 11:
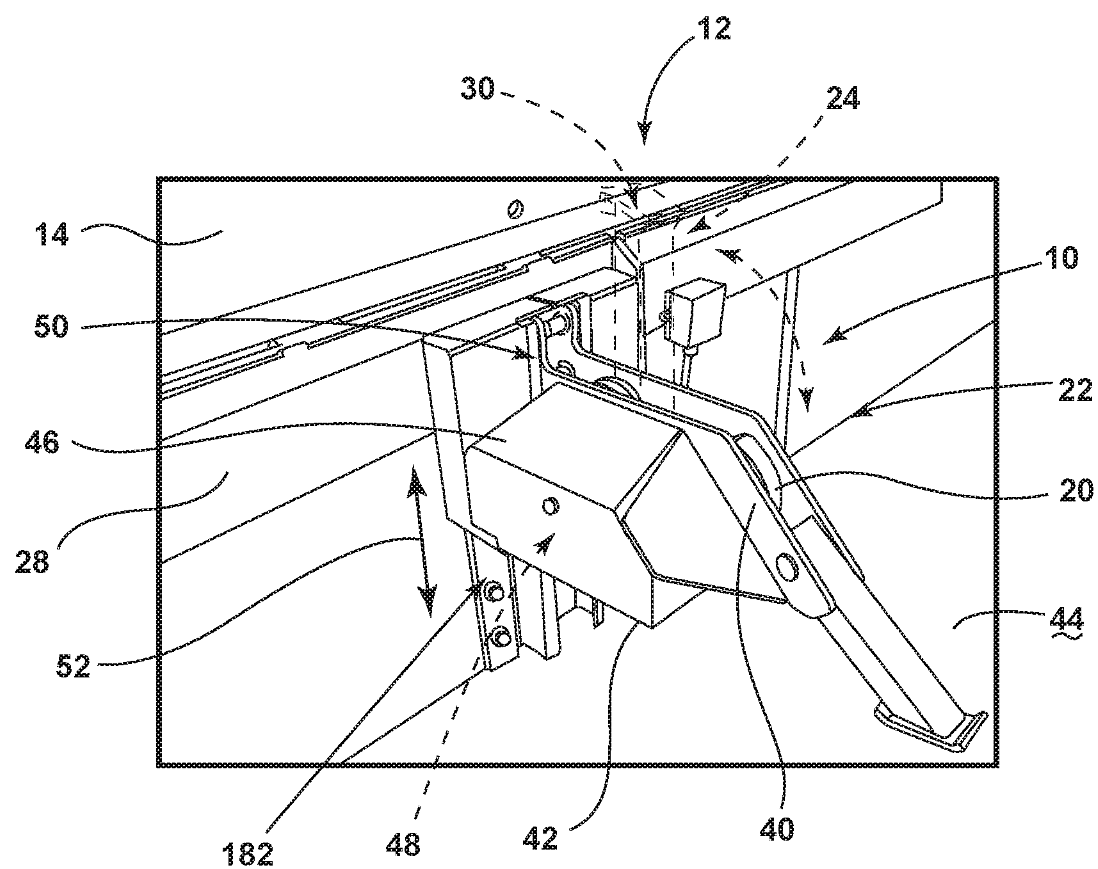
FIG. 11 is a side perspective view of an aspect of a barricade restraint set in a stored position and showing the operable latch in a retracted position.

As exemplified in FIGS. 4 and 5, the operable latch 30 can be linearly operable between the retracted and extended positions 34, 36. It is contemplated that the linear operation between the retracted and extended positions 34, 36 of the operable latch 30 can be through a biasing mechanism 100. This biasing mechanism 100, which is typically operated by a spring, can retract when the barricade member 20 is moved out of the blocking position 24. When the barricade member 20 is moved into the blocking position 24, the internal spring 102 of the biasing mechanism 100 can bias the operable latch 30 to the extended position 36 and over at least a portion of the rear impact guard 82. In this manner, it is contemplated that the operable latch 30 can be biased toward the extended position 36.

Referring now to FIGS. 6-9, it is contemplated that the operable latch 30 can be a rotationally operable member that is operable between the retracted and extended positions 34, 36 about a latch pivot 110 that extends through a portion of the barricade member 20. This latch pivot 110 can include a biasing mechanism 100 that biases the operable latch 30 toward the extended position 36. It is also contemplated that the operable latch 30 can be rotationally operable from the extended position 36 to the retracted position 34 when the barricade member 20 is moved from the blocking position 24, and vice versa when the barricade member 20 moves into the blocking position 24.

According to the various embodiments, as exemplified in FIGS. 1-9 and 11, the barricade restraint 10 can also include a verification position 120. In the verification position 120, the barricade member 20 rotates forward past the blocking position 24 and toward the wall 28 of the loading dock 12. This verification position 120 serves to ensure that the rear impact guard 82 is located in the restraining area 68 between the barricade member 20 and the wall 28 of the loading dock 12. To assist in the movement of the barricade member 20 to the verification position 120, the barricade restraint 10 can include a tilt sensor 122 that monitors the rotational position of the barricade member 20. When the barricade member 20 passes the blocking position 24 and moves toward the wall 28 of the loading dock 12, the tilt sensor 122 monitors the position of the barricade member 20 when it engages an obstruction. If this obstruction is the wall 28 of the loading dock 12, the tilt sensor 122 measures this rotational movement and verifies that the rear impact guard 82 is not located between the barricade member 20 and the wall 28 of the loading dock 12. Conversely, where the barricade member 20 does engage the rear impact guard 82 and stops short of the wall 28 of the loading dock 12, the tilt sensor 122 monitors the rotational position of the barricade member 20 and verifies that the rear impact guard 82 is located in the restraining area 68. It is contemplated that the operable latch 30 can be used to assist the tilt sensor 122 in this verification phase. When the barricade member 20 engages either the wall 28 of the loading dock 12 or the rear impact guard 82, the operable latch 30 may be biased away from the extended position 36. This movement of the operable latch 30 may serve as an additional indicia or signal as to whether the rear impact guard 82 is located between the barricade member 20 and the wall 28 of the loading dock 12.

Referring again to FIGS. 2-9 and 11, the operable latch 30 can be operated solely by the biasing mechanism 100 contained within the operable latch 30. In such an embodiment, the biasing mechanism 100 maintains the operable latch 30 in the extended position 36. Where an obstruction engages latching end 130 of the operable latch 30, such engagement may bias the operable latch 30 back toward the retracted position 34.

Referring again to FIGS. 2-9 and 11, it is also contemplated that the operable latch 30 can be moved between the extended and retracted positions 36, 34 through the operation of an actuator 132. This actuator 132 can be a two-way actuator that manipulates the operable latch 30 between the extended and retracted positions 36, 34. The actuator 132 can also be a one-way actuator that serves to overcome the biasing force 134 of the biasing mechanism 100 to manipulate the operable latch 30 from the extended position 36 to the retracted position 34. When it is necessary for the operable latch 30 to move back to the extended position 36, the actuator 132 can disengage and allow the biasing mechanism 100 to apply the biasing force 134 that extends, or rotates, the operable latch 30 to the extended position 36. It is also contemplated that the operable latch 30 can include an internal locking mechanism 136 that secures the operable latch 30 in the extended position 36. Such an internal locking mechanism 136 may assist in preventing an upward force 138 from the rear impact guard 82 from moving the operable latch 30 back to the retracted position 34 and allowing the rear impact guard 82 to extend over the barricade member 20. The internal locking mechanism 136 serves to maintain the operable latch 30 in the extended position 36 to further maintain the positioning of the rear impact guard 82 between the barricade member 20 and the wall 28 of the loading dock 12. The extended and retracted positions 36, 34 of the operable latch 30 can be defined by portions of the operable latch 30 engaging a surface of the barricade member 20. In this manner, over rotation of the operable latch 30 can be prevented. By way of example, when the operable latch 30 reaches the extended position 36, the biasing mechanism 100 urges a portion of the operable latch 30 against the barricade member 20. This surface may be an outer surface 150 or an internal stopping surface 152 that engages the operable latch 30. Similarly, the outer surface 150 of the barricade member 20 and/or the internal stopping surface 152 may also prevent rotation of the operable latch 30 beyond the retracted position 34.

When the barricade member 20 is in the blocking position 24 and the operable latch 30 is in the extended position 36, the barricade member 20 is adapted to engage a back surface 160 of the rear impact guard 82. Additionally, the operable latch 30 is adapted to engage a top surface 162 of the rear impact guard 82. Accordingly, the barricade member 20 and the operable latch 30 are adapted to at least partially surround the rear impact guard 82 to provide at least two directions of securing force to maintain the position of the rear impact guard 82 in the restraining area 68 relative to the wall 28 of the loading dock 12.

As discussed above, the vertical support provided by the operable latch 30 may be useful as the design of the barricade restraint 10 typically calls for the blocking position 24 to be defined by a single rotational position. In this manner, the rear impact guard 82 can be located in a series of lateral positions within the restraining area 68 between the barricade member 20 and the blocking position 24 and the wall 28 of the loading dock 12. Accordingly, the rear impact guard 82 may or may not be in contact with the barricade member 20 and the operable latch 30 while in the restraining area 68. Regardless of the position of the rear impact guard 82 within this restraining area 68, the blocking position 24 of the barricade member 20 is limited to this vertically oriented position substantially parallel with the wall 28 of the loading dock 12. The addition of the operable latch 30 serves to provide some vertical securing force to prevent the rear impact guard 82 from escaping this restraining area 68 between the barricade member 20 and the wall 28 of the loading dock 12.

Referring now to FIGS. 1-11, having described various aspects of the operable latch 30 incorporated within the barricade restraint 10, a method 400 is disclosed for operating a barricade restraint 10 that includes the operable latch 30. According to the method 400, the barricade member 20 is rotated from the stored position 22 and toward the blocking position 24 (step 402). Typically, the stored position 22 will be a generally horizontal orientation of the barricade member 20. Additionally, the stored position 22 of the barricade member 20 may also be defined by a lowered position 180 of the barricade restraint 10 along the track system 50. Alternatively, the stored position 22 of the barricade member 20 can be defined by the barricade member 20 being positioned below the top edge 170 of the structural plates 40 for the barricade restraint 10. As the barricade member 20 is moved toward the blocking position 24, the barricade member 20 may continue rotation past the blocking position 24 to conduct a verification step (step 404). This verification step 404 is defined by the barricade member 20 being rotated past the blocking position 24 and toward the verification position 120. This movement of the barricade member 20 toward the blocking position 24 as well as to the verification position 120 during the verification step 404 may also be in conjunction with a selective and vertical translation 52 of the barricade restraint 10 along the track system 50 and into a raised position 182 above the ground surface 44. The selective vertical translation 52 can be utilized to accommodate a wide variety of rear impact guards 82 as well as rear impact guards 82 that may be bent or damaged. When the barricade member 20 is stopped by an obstruction, the tilt sensor 122 of the vehicle restraint measures the rotational position of the barricade member 20 when it encounters the obstruction. According to step 406, the barricade member 20 is returned to the blocking position 24 when the verification step 404 determines that a rear impact guard 82 of a trailer 26 is positioned between the barricade member 20 and the wall 28 of the loading dock 12. Alternatively, where the barricade member 20 engages the wall 28 of the loading dock 12, the barricade member 20 can be returned to the stored position 22 after the verification step 404 determines that the rear impact guard 82 was not properly positioned in the restraining area 68. According to step 408 of the method 400, when the barricade member 20 is returned to the blocking position 24 with the rear impact guard 82 positioned between the barricade member 20 and the wall 28 of the loading dock 12, the operable latch 30 is positioned in the extended position 36. This extended position 36 is defined by a portion of the operable latch 30 extending into and over the restraining area 68. This positioning of the operable latch 30 serves to provide at least some vertical support for preventing the rear impact guard 82 from moving in an upward direction and over the barricade member 20 of the barricade restraint 10.

According to the various embodiments, the barricade restraint 10 having the operable latch 30 that is linearly or rotationally operable with respect to the barricade member 20 can be adapted to secure a rear impact guard 82 of a trailer 26, transport truck, or other similar vehicle that is compatible with loading and unloading via a loading dock 12.

It is further contemplated that the operating mechanism for removing the operable latch 30 between the extended and retracted positions 36, 34 can be incorporated within the barricade motor 48. In such an embodiment, it is contemplated that when the barricade member 20 is secured by the locking member 60, further operation of the barricade motor 48 can manipulate the position of the operable latch 30 between the extended and retracted positions 36, 34. It is also contemplated that the operable latch 30 can be activated through a separately dedicated actuator 132.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle restraint for a loading dock, the vehicle restraint comprising:

a barricade member that is rotationally operable between a stored position, a blocking position and a verification position, wherein the barricade member in the blocking position selectively secures the a vehicle relative to the loading dock; and a locking member that is rotationally operable between a locking position and a release position, wherein the locking member is selectively operable to the locking position when the barricade member is in the blocking position; and a barricade motor that selectively activates to rotationally operate the barricade member between the stored, blocking and verification positions, wherein the barricade motor is selectively idle when the locking member is in the locking position and the barricade member is in the blocking position, and wherein the locking member selectively maintains the barricade member in the blocking position.

2. The vehicle restraint of claim 1, further comprising:

a locking motor that is selectively activated to operate the locking member between the locking and release positions.

3. The vehicle restraint of claim 1, wherein the barricade member is attached to a back plate that is vertically operable relative to the loading dock, wherein vertical translation of the back plate selectively defines lowered and raised positions of the barricade member.

4. The vehicle restraint of claim 3, wherein the back plate is operably attached to a track system that is coupled to the loading dock, and wherein the back plate and the barricade member are vertically operable relative to the track system.

5. The vehicle restraint of claim 1, wherein the blocking position of the barricade member is defined by the barricade member being oriented in a generally vertical position with respect to the loading dock.

6. The vehicle restraint of claim 1, wherein the barricade member includes an operable latch that is linearly operable between retracted and extended positions.

7. The vehicle restraint of claim 6, wherein the operable latch is laterally operable with respect to the barricade member.

8. The vehicle restraint of claim 1, wherein the locking member remains in the release position when the barricade member is distal from the blocking position.

9. The vehicle restraint of claim 1, further comprising:

a tilt sensor that monitors a rotational position of the barricade member.

10. The vehicle restraint of claim 9, wherein the tilt sensor is in communication with the barricade motor.

11. The vehicle restraint of claim 1, wherein the blocking position is defined by a single rotational position of the barricade member.

12. A vehicle restraint for a loading dock, the vehicle restraint comprising:

a barricade member that is rotationally attached to a base, and wherein the barricade member is rotationally operable between stored, blocking and verification positions, wherein the base and the barricade member are vertically operable relative to the loading dock;

a barricade motor that selectively activates to rotationally operate the barricade member between the stored, blocking and verification positions; and a locking member that is operable between a locking position and a release position, wherein the locking member is selectively operable to the locking position when the barricade member is in the blocking position, wherein the barricade motor is selectively idle when the locking member is in the locking position and the barricade member is in the blocking position, and wherein the locking member selectively maintains the barricade member in the blocking position.

13. The vehicle restraint of claim 12, wherein the barricade member is attached to a back plate that is vertically operable relative to the loading dock, wherein vertical translation of the back plate selectively defines lowered and raised positions of the barricade member.

14. The vehicle restraint of claim 13, wherein the back plate is operably attached to a track system that is coupled to the loading dock, and wherein the back plate and the barricade member are vertically operable relative to the track system.

15. The vehicle restraint of claim 12, wherein the blocking position of the barricade member is defined by the barricade member being oriented in a generally vertical position with respect to the loading dock.

16. The vehicle restraint of claim 12, wherein the locking member remains in the release position when the barricade member is distal from the blocking position.

17. The vehicle restraint of claim 15, wherein the blocking position is defined by a single rotational position.

18. The vehicle restraint of claim 12, further comprising:

a tilt sensor that monitors a rotational position of the barricade member.

19. A vehicle restraint comprising:

a barricade member that is rotationally operable relative to a base between stored, blocking and verification positions, wherein the barricade member is coupled with a back plate that is configured to be vertically operable relative to a loading dock, wherein vertical translation of the back plate selectively defines lowered and raised positions of the barricade member;

a barricade motor that selectively activates to rotationally operate the barricade member between the stored, blocking and verification positions; and a locking member that is operable between a locking position and a release position, wherein, the locking member is selectively operable to the locking position when the barricade member is in the blocking position;

the barricade motor is selectively idle when the locking member is in the locking position and the barricade member is in the blocking position; and the locking member selectively maintains the barricade member in the blocking position.

20. The vehicle restraint of claim 19, further comprising:

a tilt sensor that monitors a rotational position of the barricade member.

* * * * *